UNITED STATES PATENT OFFICE.

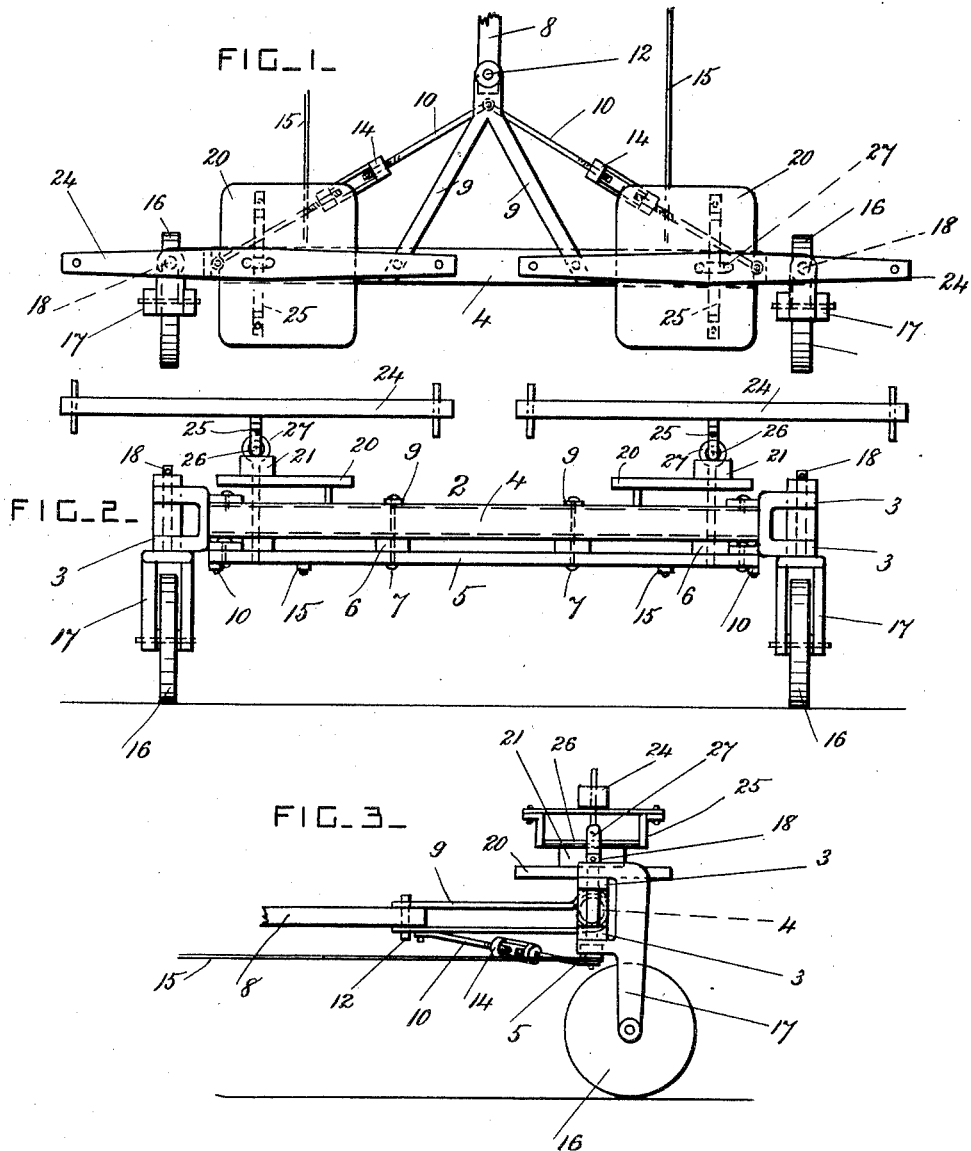

FRANK J. ROST, OF KULM, NORTH DAKOTA.

DRAFT ATTACHMENT.

1,098,643.      Specification of Letters Patent.      Patented June 2, 1914.

Application filed January 29, 1914. Serial No. 815,298.

*To all whom it may concern:*

Be it known that I, FRANK J. ROST, a citizen of the United States, residing at Kulm, in the county of Lamoure and State of North Dakota, have invented certain new and useful Improvements in Draft Attachments; and I do hereby declare the following to be a full, clear, and exact description of the invention, such as will enable others skilled in the art to which it appertains to make and use the same.

This invention relates to a draft attachment for connecting a plurality of agricultural implements to a traction engine; and it consists in the novel construction and combination of the parts hereinafter fully described and claimed.

In the drawings, Figure 1 is a plan view of a draft attachment constructed according to this invention. Fig. 2 is a front view, and Fig. 3 is an end view, of the draft attachment.

This invention is principally used to connect a plurality of grain drills and disk harrows to a single traction engine, for use in the field, but it may be used to connect any other suitable implements to a traction engine.

The draft attachment has a main beam 2 provided with bearings 3 at its ends. The beam 2 is of any approved construction, and it preferably consists of a metallic tube 4 and a wooden bar 5 arranged underneath the tube and separated from it by distance blocks 6, and secured to it by bolts 7.

A draw-bar 8 is secured to the traction engine on the center of the line of draft, and 9 are bars, and 10 are braces, which are pivoted to the draw-bar by a vertical pin 12. The bars 9 are secured to the middle part of the main beam, and the braces are secured to the end portions of the main beam, and are provided with turnbuckles 14 so that the strains may be distributed evenly on the beam.

Guide cables or chains 15 are connected to the bar 5, below the tube 4, and their front ends are secured to the traction engine, so that the engine can turn around with its load to good advantage.

Caster wheels 16 are journaled in brackets 17, and the brackets 17 are pivotally connected with the bearings 3 by vertical spindles 18. The caster wheels run on the ground, and take the whole weight of the draft attachment.

Platforms 20 for the operators to stand on are secured to the end portions of the main beam 2, and blocks 21 are secured above the platforms. Two long whiffletrees 24 are provided, and each whiffletree has a bracket 25 secured to its underside and provided with a bar 26 which is arranged longitudinally of the line of draft of the machine and crosswise of the whiffletree. The bars 26 are pivoted in and are slidable longitudinally in eyes 27 which are secured to the beam 2 above the blocks 21, and the bars 26 rest on the blocks 21.

The drills and harrows are connected to the whiffletrees in any approved way, and when the attachment is in use the front end portions of the bars and their brackets usually engage with the eyes 27. The whiffletrees can move pivotally in the eyes to a limited extent, and they can also slide rearwardly and independently of each other.

The construction of the parts 25, 26 and 27 is such that the draft of the agricultural tools pulls the whiffletrees to the rear as far as possible while the traction is going forward, and it permits the traction engine to be backed to a considerable extent without affecting the position of the agricultural tools. This is frequently a great advantage in order to make the traction engine follow a preferred course, and move back and forth a little while its steering gear is being manipulated; and it also permits the agricultural tools to follow the engine around in turning.

By the use of this attachment several large agricultural implements can be connected to a single traction engine, and a large ground surface can be worked at each journey of the engine across the field.

What I claim is:

1. In a draft attachment, the combination, with a main beam provided with caster wheels at its ends and having coupling devices for connecting it to a traction engine, of two whiffletrees having bars secured to their middle parts and arranged crosswise of them, and means for pivotally connecting the said bars with the main beam and permitting them to slide back and forth longitudinally.

2. In a draft attachment, the combination, with a main beam provided with caster wheels at its ends and having coupling devices for connecting it to a traction engine, of two whiffletrees having bars secured to their middle parts and arranged crosswise of them, blocks secured to the end portions of the main beam, and eyes projecting above the said blocks, the said bars being free to slide longitudinally in the said eyes and being movable pivotally in them and on the said blocks.

3. In a draft attachment, the combination, with a main beam provided with caster wheels at its ends, a central draw-bar adapted to be secured to a traction engine, bars and braces pivoted to the draw-bar, said bars being connected to the middle part of the beam and the said braces being connected to the end portions of the beam and provided with means for adjusting their length; of two whiffletrees, and means for pivotally connecting the whiffletrees with the end portions of the main beam and permitting them to slide back and forth parallel to the line of draft and independently of each other.

4. In a draft attachment, the combination, with a main beam provided with caster wheels at its ends and having coupling devices for connecting it to a traction engine, of two whiffletrees, and means for pivotally connecting the whiffletrees with the end portions of the main beam and permitting them to slide back and forth parallel to the line of draft and independently of each other.

In testimony whereof I have affixed my signature in the presence of two witnesses.

FRANK J. ROST.

Witnesses:
J. M. RENZ,
P. M. TITUS.

---

Copies of this patent may be obtained for five cents each, by addressing the "Commissioner of Patents, Washington, D. C."